United States Patent
Sheikh et al.

(10) Patent No.: US 12,437,278 B2
(45) Date of Patent: Oct. 7, 2025

(54) DECENTRALIZED TRANSACTION SYSTEM AND METHOD OF OPERATING DECENTRALIZED TRANSACTION SYSTEM

(71) Applicant: METTALEX LIMITED, Bury St Edmunds (GB)

(72) Inventors: Humayun Munir Sheikh, Bury St Edmunds (GB); Chirag Maliwal, Bury St Edmunds (GB); Mehul Surendra Gaidhani, Bury St Edmunds (GB)

( * ) Notice: Subject to any disclaimer, the term of this patent is extended or adjusted under 35 U.S.C. 154(b) by 143 days.

(21) Appl. No.: 18/515,641

(22) Filed: Nov. 21, 2023

(65) Prior Publication Data
US 2025/0165936 A1    May 22, 2025

(51) Int. Cl.
G06Q 20/00 (2012.01)
G06Q 20/10 (2012.01)
G06Q 20/22 (2012.01)
G06Q 20/38 (2012.01)
G06Q 20/40 (2012.01)

(52) U.S. Cl.
CPC ........... *G06Q 20/10* (2013.01); *G06Q 20/223* (2013.01); *G06Q 20/3825* (2013.01); *G06Q 20/3829* (2013.01); *G06Q 20/401* (2013.01); *G06Q 20/405* (2013.01); *G06Q 2220/00* (2013.01)

(58) Field of Classification Search
CPC .. G06Q 20/10; G06Q 20/223; G06Q 20/3825; G06Q 20/3829; G06Q 20/401; G06Q 20/405; G06Q 2220/00; G06Q 40/04; H04L 9/50
USPC .......... 705/16, 21, 59; 380/44, 262
See application file for complete search history.

(56) References Cited

U.S. PATENT DOCUMENTS

| | | | |
|---|---|---|---|
| 2016/0092988 A1 | 3/2016 | Letourneau et al. | |
| 2019/0370624 A1* | 12/2019 | Khoche | G06K 19/0776 |
| 2021/0192517 A1 | 6/2021 | Barnes et al. | |

OTHER PUBLICATIONS

Liu Congcong et al: "Comparison of Centralized and Peer-to Peer Decentralized Market Designs for Community Markets", IEEE Transactions on Industry Applications, IEEE Service Center, Piscataway, NJ, US, vol. 58, No. 1, Oct. 14, 2021 (Oct. 14, 2021 ), pp. 67-77.

(Continued)

*Primary Examiner* — Dante Ravetti
(74) *Attorney, Agent, or Firm* — RC Trademark Company (57) ABSTRACT

Disclosed is decentralized transaction system comprising computing nodes to implement platform, computing node(s) is configured to: receive, from first user device (FUD), first request for first trade (FT), first smart contract (FSC) to lock funds for FT; receive, from second user device, second request for second trade (ST), second smart contract (SSC) to lock trade subject (TS) for ST; send, to agent database (AD), first notification, for first autonomous agent (FAA) associated with first user (FU); second notification, for second autonomous agent (SAA) associated with second user (SU); create communication interface, FAA configured to send first set of trade parameters (FSOTP), first digital signature (FDS) to SAA, facilitate agent-based trade match, SAA configured to perform trade match, send FDS, FSOTP and second set of trade parameters (SSOTP) to SSC; employ processing interface for enabling order book-based trade verification, SSC to execute transfer of funds and trade subject to SU and FU, respectively.

14 Claims, 2 Drawing Sheets

(56) References Cited

OTHER PUBLICATIONS

Sridhar Sashank et al: "Decentralized Stock Exchange Implementation using Ethereum", 2020 International Seminar on Intelligent Technology and Its Applications (ISITIA), IEEE, Jul. 22, 2020 (Jul. 22, 2020), pp. 234-241.
International Search Report and Written Opinion issued for International Patent Application PCT/IB2024/061616, on Feb. 21, 2025, 13 Pages.

* cited by examiner

DECENTRALIZED TRANSACTION SYSTEM AND METHOD OF OPERATING DECENTRALIZED TRANSACTION SYSTEM

TECHNICAL FIELD

The present disclosure relates to decentralized transaction systems. Moreover, the present disclosure relates to decentralized transaction methods of operating the decentralized transaction systems.

BACKGROUND

In the ever-evolving landscape of decentralized finance (DeFi), decentralized exchange (DEX) serves as a fundamental component reshaping the way financial transactions occur in the digital age. The decentralized exchange refers to a peer-to-peer marketplace that facilitates direct transactions between users (such as traders) without a central authority or an intermediary (such as banks, brokers, and the like).

Generally, the decentralized exchange enables decentralized trading for assets such as cryptocurrencies and derivatives. However, such decentralized exchange offers a limited selection of assets for trading, thus limiting the users looking to diversify their portfolios with a broader range of assets, including commodities. Moreover, such decentralized exchange is complex to navigate, especially for new users. The complexity restricts the users from using the decentralized exchange effectively. Furthermore, such decentralized exchange encounters liquidity issues that restrict the users from executing large orders without significantly impacting market prices.

Additionally, existing decentralized exchange is not user-friendly, thus discouraging the users from using thereto. Moreover, the existing decentralized exchange is prone to malicious tokens that may be designed to deceive or harm unsuspecting users, leading to issues of trust and security within the decentralized exchange ecosystem.

Therefore, in light of the foregoing discussion, there exists a need to overcome the aforementioned drawbacks.

SUMMARY

The aim of the present disclosure is to provide a decentralized transaction system and a method to introduce an ingenious agent-based architecture that revolutionizes trading by facilitating direct interactions among users. The aim of the present disclosure is achieved by a decentralized transaction system and a decentralized transaction method of operating the decentralized transaction system as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a decentralized transaction system comprising a plurality of computing nodes configured to implement a platform for enabling autonomous agent-based trading using a decentralized order book model, wherein each computing node is communicably coupled to a distributed ledger arrangement, a plurality of user devices, and an agent database comprising a plurality of autonomous agents, and wherein at least one computing node is configured to:

receive, from a first user device amongst the user devices, a first request for placing a first trade on the platform, wherein upon placement of the first trade, a first smart contract executing on the distributed ledger arrangement is configured to lock funds for the first trade;

receive, from a second user device amongst the user devices, a second request for placing a second trade on the platform, wherein upon placement of the second trade, a second smart contract executing on the distributed ledger arrangement is configured to lock a trade subject for the second trade;

send, to the agent database, a first notification regarding placement of the first trade on the platform, for a first autonomous agent associated with a first user of the first user device;

send, to the agent database, a second notification regarding placement of the second trade on the platform, for a second autonomous agent associated with a second user of the second user device, the second user is a second party in the decentralized transaction;

create a communication interface for enabling peer to peer communication between the first autonomous agent and the second autonomous agent via the platform, wherein the first autonomous agent is configured to send a first set of trade parameters and a first digital signature of the first autonomous agent to the second autonomous agent in the agent database, facilitate via a processing interface agent-based trade match via the platform, wherein the second autonomous agent is configured to perform a trade match, and to send the first digital signature along with the first set of trade parameters and a second set of trade parameters to the second smart contract, wherein the second set of trade parameters is related to the second user device;

employ the processing interface for enabling order book-based trade verification via the platform, wherein the second smart contract is configured to send the first digital signature along with the first set of trade parameters and the second set of trade parameters to the first smart contract for verification, the first smart contract is configured to verify the first digital signature and the first set of trade parameters and the second set of trade parameters, and upon successful verification, the first smart contract is configured to transfer the funds for the first trade from the first smart contract to the second smart contract, the second smart contract is then configured to complete the decentralized trading by executing the transfer of the locked funds to the second user and executing the transfer of the locked trade subject to the first user.

The first aspect provides the decentralized transaction system for autonomous agent-based trading using the decentralized order book model. It will be appreciated that the decentralized transaction system empowers transparency and trust through the distributed ledger arrangement such as in blockchain. The decentralized transaction system employs the first autonomous agent and the second autonomous agent to automate the trading, making it more accessible to the first user and the second user, respectively. Moreover, the decentralized transaction system enables the distributed ledger arrangement to execute the first smart contract and the second smart contract in order to ensure secure fund and trade subject locking.

In the present disclosure, a smart contract refers to a software contract configured to run automatically when one or more conditions are met in the system, for example to automate the execution of an agreement such that all parties involved have certainty of the outcome. The smart contract may also be referred to a digital version of a conventional contract which is executed automatically when one or more conditions are met in the system. In the decentralised transaction system, the use of smart contracts saves time and computing resources which otherwise would be required, for example in communication between nodes and or user(s). The smart contract is immutable and prevents a malicious user or third-party attacks from interfering with the normal execution of the contract. When using the smart contract with the decentralized transaction system, the whole transaction process is transparent, traceable and cannot be tampered with. Further, the decentralized transaction system of the present disclosure is configured to automatically initiate and deploy the smart contract whenever a trade request is received. The smart contract thus deployed is automatically linked to the trade request. In this regard, while initiating and deploying the smart contract, the decentralized transaction system takes into consideration trade parameters received with the trade request.

The decentralized transaction system enables peer-to-peer communication to foster efficient and direct interaction between the first autonomous agent and the second autonomous agent associated with the first user and the second user. Moreover, the system employs both agent-based and order book-based trade verification, enhancing security. Beneficially, the layered approach results in a fair, efficient, and user-friendly trading system, where the first trade and the second trade execute only when all conditions are met, ultimately benefiting the first user, the second user, and the marketplace as a whole.

In a second aspect, the present disclosure provides a decentralized transaction method of operating a decentralized transaction system that comprises a plurality of computing nodes configured to implement a platform for enabling autonomous agent-based trading using a decentralized order book model, wherein each computing node is communicably coupled to a distributed ledger arrangement, a plurality of user devices, and an agent database comprising a plurality of autonomous agents, the method comprising receiving, from a first user device amongst the user devices, a first request for placing a first trade on the platform, wherein upon placement of the first trade, a first smart contract executing on the distributed ledger arrangement is configured to lock funds for the first trade;

receiving, from a second user device amongst the user devices, a second request for placing a second trade on the platform, wherein upon placement of the second trade, a second smart contract executing on the distributed ledger arrangement is configured to lock a trade subject for the second trade;

sending, to the agent database, a first notification regarding placement of the first trade on the platform, for a first autonomous agent associated with a first user of the first user device;

sending, to the agent database, a second notification regarding placement of the second trade on the platform, for a second autonomous agent associated with a second user of the second user device, the second user is a second party in the decentralized transaction;

creating a communication interface for enabling peer to peer communication between the first autonomous agent and the second autonomous agent via the platform, wherein the first autonomous agent is configured to send a first set of trade parameters and a first digital signature of the first autonomous agent to the second autonomous agent in the agent database, facilitating via a processing interface agent-based trade match via the platform, wherein the second autonomous agent is configured to perform a trade match, and to send the first digital signature along with the first set of trade parameters and a second set of trade parameters to the second smart contract, wherein the second set of trade parameters is related to the second user device;

employing the processing interface for enabling order book-based trade verification via the platform, wherein the second smart contract is configured to send the first digital signature along with the first set of trade parameters and the second set of trade parameters to the first smart contract for verification, the first smart contract is configured to verify the first digital signature and the first set of trade parameters and the second set of trade parameters, and upon successful verification, the first smart contract is configured to transfer the funds for the first trade from the first smart contract to the second smart contract, the second smart contract is then configured to complete the decentralized trading by executing the transfer of the locked funds to the second user and executing the transfer of the trade subject to the first user.

The second aspect of the present disclosure offers the decentralized transaction method that leverages the decentralized transaction system's capabilities. By combining features such as locking funds using the first smart contract and the second smart contract, the first notification and the second notification, and the order book-based trade verification, the method ensures that trades are executed securely and transparently on the platform. The communication interface enables seamless peer-to-peer interaction between the first autonomous agent and the second autonomous agent, further enhancing the trading experience. The synergy between these features streamlines the entire trading process, from receiving the first request and the second request to trade execution, reducing the risk of errors and fraud, and ultimately fostering trust in the decentralized transactions. The method optimizes the use of distributed ledger arrangement, providing a robust and user-friendly environment for the first user and the second user to engage in the autonomous agent-based trading with confidence.

Throughout the present disclosure, the term "decentralized transaction system" as used herein refers to a networked arrangement of multiple computing nodes interconnected through a data communication network. The computing nodes include computing arrangements that are operable to respond to, and processes instructions and data therein. The computing arrangements may include, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the computing arrangements can be one or more individual processors, processing devices and various elements associated with a processing device that may be shared by other processing devices. Additionally, the computing arrangements are arranged in various architectures for responding to and processing the instructions that drive the decentralized transaction system. Moreover, the plurality of computing nodes is communicably coupled to each other via the data communication network that allows for communication among the plurality of computing nodes. Notably, the data communication network refers to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system. Additionally, the data communication network employs wired or wireless communication that can be carried out via one or more known protocols.

Herein, the platform refers to a digital environment that serves as a foundation for enabling various functionalities, particularly autonomous agent-based trading. Optionally, the platform is the technological infrastructure that facilitates and coordinates trading activities. Herein, the decentralized order book model refers to a system for recording and managing trade orders in a distributed and transparent manner. In this regard, the decentralized order book model is used to maintain information about buy and sell orders across the plurality of computing nodes in the data communication network. In other words, the decentralized order book is a trading mechanism where buy and sell orders are matched through a distributed network of nodes, rather than being centralized in a single location or controlled by a single entity. In the decentralized order book, users can submit orders and execute trades without the need for intermediaries or central authorities, which helps users achieve the prices they want more closely and improve transparency. Herein, the agent database refers to a structured repository of the plurality of autonomous agents. In this regard, the autonomous agents are individual programs that have independent agent databases. Moreover, each user has its own autonomous agent which is irreplaceable directly by the system. The autonomous agent getting notified is an action that results from the autonomous agent monitoring particular smart contracts (such as the smart contracts associated with the corresponding user) for change of state (such as the data stored in the smart contract). Throughout the present disclosure the term "autonomous agents" as used herein, relates to computational entities or software programs that are designed to perform tasks or make decisions autonomously, without direct human intervention. The autonomous agent could perceive their environment, analyse information, and take actions based on predefined rules, algorithms, or learning capabilities. Optionally, the autonomous agent is an autonomous economic agent (AEA). Optionally, each of the autonomous agent has predefined roles in the trading process, enabling automation and efficient execution of trades.

The term "user device" as used herein refers to an electronic device that a given user interacts with to access the decentralized transaction system. Examples of the user device include, but are not limited to, smartphones, tablets, laptops, or desktop computers. The user devices act as interfaces for the users to engage with the decentralized transaction system. Herein, the first user device is associated with the first user and initiates the first request. Herein, the second user device is associated with the second user and initiates the second request. In an example, the first request is to purchase 50 tokens. In an example, the second request is to sell 50 tokens. Herein, the first trade and the second trade refer to a specific transaction that results from the first request and the second request, respectively. In this regard, the first trade and the second trade involve the exchange of assets or securities as per the first request and the second request made by the first user device and the second user, respectively.

Optionally, a given request is received from at least one of: a software application executing on a given user device, a software application executing on a computing device that is communicably coupled to the given user device, a cloud-based software application, a digital twin of the given user a digital representation of the given user, an artificial intelligence model (AI-model) based on a Large Language Model (LLM). In this regard, for example, the software application could be a trading interface application. In such a case, a trader may use the trading interface application on their computer to make the given request to execute a given trade. Optionally, the software application could be an algorithmic trading bot that is communicably coupled to the given user's trading account. Optionally, the cloud-based software application could be a price tracking and analysis tool provided by the platform. Optionally, the service request can be received from the digital twin that refers to a virtual representation of the given user. Optionally, the given digital twin employs market data analysis, machine learning, and algorithmic decision-making to assist the given user in executing the given request.

For example, the digital representation could be a trading assistant bot or an AI model that interacts with the platform on the given user's behalf. Herein, the term "distributed ledger arrangement" refers to a ledger (such as a database) comprising entries recording operations and/or smart contracts (such as the first smart contract and the second smart contract), with a timestamp. According to the common knowledge in the field of computer science and distributed ledgers, smart contracts may be one or more computer algorithms, or a transaction protocols, where these may be executed via computer programs, respectively intended to automatically execute events or actions according to agreed terms (the contract terms). In this regard, a plurality of first computing nodes implements a distributed ledger technology (DLT) technology. Beneficially, the DLT allows for secure and transparent record-keeping, without the need for intermediaries or centralised authorities. Optionally, the smart contracts may also control, record or document such events or actions according to the terms agreed, for example, agreed on a contract. Optionally, the distributed ledger arrangement is consensually shared and synchronised in a decentralised form across the plurality of autonomous agents. Optionally, the distributed ledger arrangement refers to a database of entries or blocks of data such as a blockchain. The distributed ledger arrangement ledger ensures that all data and models are tamper-proof and transparent to the plurality of autonomous agents.

The at least one computing node is configured to receive the first request from the first user device for placing the first trade. In this regard, when the first user initiates the first trade request, the first smart contract on the distributed ledger arrangement is employed to secure the funds for the first trade. Furthermore, when the first user initiates the first trade request, the distributed ledger arrangement is configured to automatically initiate and deploy the first smart contract in accordance with trade parameters received for the first trade request. Accordingly, when the second user initiates the second trade request, the distributed ledger arrangement is configured to automatically initiate and deploy the second smart contract in accordance with the trade parameters received for the second trade request.

The term "trade subject" as used herein refers to an item or asset that is being traded. Optionally, the trade subject is selected from at least one of: a commodity, a digital currency. Herein, the commodity refers to a tangible good or product that can be bought or sold, such as agricultural produce, metals, or energy resources. Herein, the digital currency represents a form of currency that exists solely in electronic or digital form, typically utilizing cryptographic techniques for secure transactions. Optionally, the digital assets include but are not limited to cryptocurrencies, NFTs, and digital representations of real-world assets. By incorporating the commodities and the digital currencies into the decentralized transaction system, the users can engage in diverse trading activities, thereby expanding the scope and versatility of the platform. In this regard, when the second user initiates the second trade request, the second smart contract on the distributed ledger arrangement is employed to lock the trade subject for the second trade. This ensures that the necessary resources are reserved for successful trade execution, promoting trust and security in the decentralized trading. Locking of the fund for the first trade and/or the trade subject for the second trade by the first smart contract and/or the second smart contract involves executing a transaction which appends a new entry in the distributed ledger arrangement such as a new block in the blockchain. Execution of the transaction for the locking of the fund for the first trade and/or the trade subject for the second trade transfers the ownership of the fund to the first smart contract and transfers the ownership of the trade subject to the second smart contract.

Herein, the first notification and the second notification refer to an automated message that facilitates communication between the given user devices, the given autonomous agents, and the platform. In this regard, when the first user places the first trade using the first user device, the at least one computing node receives the first request. The at least one computing node then formulates the first notification and sends the first notification to the agent database. The agent database identifies the first autonomous agent associated with the first user and provides the first notification thereto.

In this regard, when the second user places the second trade using the second user device, the at least one computing node receives the second request. The at least one computing node then formulates the second notification and sends the second notification to the agent database. The agent database identifies the second autonomous agent associated with the second user and provides the second notification thereto.

Herein, the communication interface refers to an interface that enables direct and secure interaction between the first autonomous agent and the second autonomous agent involved in the first trade and the second trade. The communication interface is automatically created once the decentralized transaction system identifies that the first and the second autonomous agent are required to interact with each other to fulfil the request for the trade. The communication interface may also be referred to a piece of software or a set of instructions which when executed enables the first autonomous agent and the second autonomous agent to communicate. The communication interface serves to exchange crucial trade-related information, such as trade parameters and digital signatures, which are essential for the verification and execution of the trade. This peer-to-peer communication enhances the efficiency and security of the trading. Herein, the digital signature serves as a cryptographic proof of its identity and authorization. In this regard, the first set of trade parameters and the first digital signature of the first autonomous agent is sent to the second autonomous agent, representing the other party, and is stored in the agent database for future reference during the trade verification process. In this regard, the first autonomous agent associated with the first user represents on behalf of the first user who is a first party and the second autonomous agent associated with the second user represents on behalf of the second user who is a second party in a peer-to-peer decentralized transaction. The communication interface ensures that these crucial trade elements are exchanged in a secure and efficient manner, promoting effective peer-to-peer interaction between the autonomous agents.

Optionally, the first set of trade parameters comprises at least one of: a timeframe needed for completion of the first trade, a cost associated with the first trade, a quantity associated with the first trade, a quality associated with the first trade, a customised instruction associated with the first trade, an asset type, a preference of the autonomous agents, or delivery terms. In this regard, the timeframe parameter may specify a specific duration within which the first trade should be completed. Optionally, the cost parameter may indicate the monetary value associated with executing the first trade. Optionally, the quantity parameter may define the amount or volume involved in the first trade. Optionally, the quality parameter may describe the desired level of excellence or standard for the first trade. Optionally, the customized instruction parameter may provide specific instructions or requirements for the execution of the first trade. Optionally, the asset type parameter may identify the type or category of asset involved in the first trade. Optionally, the preference parameter may indicate the favoured choice or inclination of the first autonomous agent and the second autonomous agent involved in the trade. Optionally, the delivery terms parameter may specify the conditions or terms for the delivery of the traded goods or services. Beneficially, the first set of trade parameters enables flexibility and adaptability in tailoring the execution of the first trade to meet specific requirements and preferences.

The term "processing interface" as used herein refers to a software module or component that allows for the processing and management of various operations related to agent-based trade matching within the decentralized transaction system. In this regard, the processing interface is used by the at least one computing node to facilitate to handle the coordination, validation, and execution of the agent-based trade matches and related actions. Moreover, the second autonomous agent, representing one party in the trade, is configured to perform the trade match. Furthermore, the trade match involves comparing the first set of trade parameters and the second set of trade parameters to determine if there's a suitable trade match with the second autonomous agent trade parameters. Once the trade match is identified, the second autonomous agent is configured to send the first digital signature along with the first set of trade parameters and the second set of trade parameters. It will be appreciated that the aforementioned information is sent to the second smart contract for further verification and execution of the trade, ensuring that both user's interests are protected and that the trade progresses smoothly.

Optionally, the second set of trade parameters comprises at least one of: a timeframe needed for completion of the second trade, a cost associated with the second trade, a quantity associated with the second trade, a quality associated with the second trade, a customised instruction associated with the second trade, an asset type, a preference of the autonomous agents, or delivery terms. In this regard, the timeframe parameter ensures timely execution of the second trade within a specific time window. The cost parameter provides transparency and well-defined monetary value for the trade. The quantity parameter clarifies the scale of the transaction by defining the volume or amount of assets involved. The quality parameter ensures that the traded items meet predefined criteria. The customized instruction parameter caters to unique requirements by allowing specific directives or preferences. Optionally, the asset type parameter ensures clarity regarding the nature of the transaction. The preference of the autonomous agents parameter is set such that it aligns with the interests and goals of the second user associated with the second autonomous agent. Optionally, the delivery terms parameter enhances transparency and agreement between the first autonomous agent and the second autonomous agent regarding the conditions for delivering goods or services.

The at least one computing node is configured to employ the processing interface for enabling order book-based trade verification via the platform. In this regard, the processing interface acts as a gateway for communication between the second smart contract and the first smart contract to verify the authenticity of the first trade and the second trade. Herein, the order book-based trade verification refers to a process in which the details of a given trade are confirmed by comparing them with records in an order book. Optionally, the order book contains information about buy and sell orders and verifying the trade against the order book ensures that it matches the terms and conditions specified by both the first autonomous agent and the second autonomous agent. When the second smart contract is configured to send the first digital signature along with the first set of trade parameters and the second set of trade parameters to the first smart contract, it ensures that the trade details are authentic and accurate. This step prevents fraudulent or unauthorized trades, making the decentralized trading system more trustworthy and secure.

Optionally, the second autonomous agent is configured to use a distributed public key infrastructure (PKI) to verify the first digital signature and the first set of trade parameters. The term "distributed public key infrastructure" refers to a framework used in cybersecurity and cryptography to manage digital keys and certificates. The distributed public key infrastructure provides a secure way to authenticate the identities of parties involved in digital communications and to ensure the confidentiality and integrity of the information being exchanged. In the distributed PKI, each entity is assigned a pair of cryptographic keys: a public key and a private key. The public key is openly available, while the private key is kept secret. The public key is used to encrypt data or verify digital signatures, and the private key is used to decrypt data or create digital signatures. The distributed public key infrastructure relies on trusted entities, known as certificate authorities (CAs), to issue and verify digital certificates that bind the public key to an individual or entity, ensuring the authenticity and security of online transactions, communications, and data.

Optionally, the first smart contract is configured to use a distributed public key infrastructure (PKI) to verify the first digital signature and the first set of trade parameters. In this regard, the second autonomous agent uses the distributed public key infrastructure (PKI) to verify the first digital signature and the first set of trade parameters. In this regard, the PKI is employed to validate the authenticity of the digital signature, ensuring that it was created by the authorized party and that the trade parameters are accurate.

It will be appreciated that using the distributed PKI system for verification enhances security and trust. For example, if the first user and the second user are trading on the platform, the distributed PKI would ensure that only the first user's private key can generate the first digital signature that can be verified by the second user's corresponding public key. This cryptographic method ensures the integrity of the first trade and the second trade and the security of the decentralized trading environment.

The second smart contract is then configured to complete the decentralized trading by executing the transfer of the locked funds and the locked trade subject meaning that the second smart contract releases the funds and the trade subject that were locked in the smart contract when the trade was initiated. In this regard, the execution of the transfer of the locked funds and the locked trade subject is governed by the first set of trade parameters and the second set of trade parameters defined within the smart contract. Further, the execution of the transfer of the locked funds and the locked trade subject cannot be tampered because of immutable nature of the smart contract. The transfer of the locked funds is initiated only after a consensus is reached between the plurality of computing nodes in the decentralized transaction system. Furthermore, the transfer of the locked funds is traceable and transparent in the decentralized transaction system. Moreover, the second smart contract uses the cryptographic keys and the underlying distributed ledger arrangement to ensure that the transfer of the locked funds to the second user and the trade subject to the first user is secure and tamper-proof transfer. Optionally, the security is ensured through consensus mechanisms, and the immutable nature of the distributed ledger arrangement. Further, the execution of the transfer of locked funds and the locked trade subject is associated with generating a new block in the blockchain. A new block is generated only when the consensus is reached between the plurality of computing nodes in the decentralized transaction system, thus ensuring the generation of a valid new block. In this regard, a consensus protocol ensures achieving reliability and trustworthiness between the plurality of computing nodes being unknown to each other.

Optionally, when the transfer of the locked funds is executed for the first trade from the first smart contract to the second smart contract, an ownership of the locked funds is transferred from the first user to the second user and, wherein when the transfer of the locked trade subject is executed for the second trade from the second smart contract to the first smart contract, an ownership of the locked trade subject is transferred from the second user to the first user. In this regard, a transfer of ownership of the locked funds and/or the locked trade subject has the effect of creating a new entry in the distributed ledger arrangement. Herein, the new entry in the distributed ledger arrangement corresponds to creation of a new block or appending a new block to the existing blocks. Creation of the new block is done only after the consensus is reached between the plurality of computing nodes. The new block thus created ensures that transaction related to the transfer of ownership of the locked funds and/or the locked trade subject is valid. In this regard, when the first trade is executed and the second smart contract receives the locked funds from the first smart contract, an ownership transition occurs. The ownership of the locked funds shifts from the first user (the buyer of the trade subject) to the second user (the seller of the trade subject). Similarly, when the trade subject is transferred from the second smart contract to the first smart contract, the ownership of the locked trade subject changes hands from the second user to the first user. The distributed ledger arrangement ensures that the ownership changes are securely and immutably recorded. The record is vital in the decentralized transaction system to prevent disputes or unauthorized changes in the ownership of the funds and the trade subject.

Optionally, the at least one computing node is configured to:
  upon receiving the first request for placing the first trade on the platform, check whether an autonomous agent that is configured to serve the first request exists in the agent database;
  when the autonomous agent that is configured to serve the first request exists in the agent database, use said autonomous agent as the first autonomous agent;
  when the autonomous agent that is configured to serve the first request does not exist in the agent database, create a new autonomous agent and use the new autonomous agent as the first autonomous agent.

In this regard, upon receiving the first request, the at least one computing node checks whether the autonomous agent capable of handling the first request already exists in the agent database. If the suitable autonomous agent is found in the agent database, the at least one computing node assigns the suitable autonomous agent to serve the first request. This ensures the efficient utilization of resources and expertise. For example, if the first request involves commodities and derivatives trading, the at least one computing node may assign an agent specialized in these markets.

Moreover, optionally, in another case where there is no existing autonomous agent suitable for fulfilling the first request, the at least one computing node is configured to create the new autonomous agent. The new autonomous agent is then assigned to serve the first request. For example, if the first user's request is related to a highly specialized or niche market, the at least one computing node generates the autonomous agent trained specifically for that market or trading strategy. It will be appreciated that the system optimizes the utilization of the autonomous agents by reusing existing ones when appropriate. This reduces the overhead associated with creating the new autonomous agents for every request, enhancing the decentralized transaction system's efficiency. Additionally, by creating the new autonomous agents when needed, the decentralized transaction system ensures scalability. The decentralized transaction system can dynamically adapt to a growing number of the first requests and the first users.

Furthermore, the decentralized transaction system allows for the creation of the specific autonomous agents tailored to unique first requests, ensuring that each first request is handled by the suitable autonomous agent with the relevant expertise. Optionally, the at least one computing node is configured to perform the same steps for the second request as well, ensuring that each trade request, whether the first or second, is handled efficiently and with the most appropriate autonomous agent.

Optionally, the distributed ledger arrangement further comprises a smart contract map configured to associate a given smart contract with a given autonomous agent and to record the given smart contract as being associated with the given autonomous agent. The term "smart contract map" is a component that exists within the distributed ledger arrangement. In this regard, the smart contract map is used for associating the given smart contract (such as the first smart contract or the second smart contract) with the given autonomous agent (such as the first autonomous agent or the second autonomous agent) and maintaining the record of the association. This association is established and maintained to ensure that the smart contracts execute in alignment with the intended actions of the autonomous agents, thereby facilitating the secure and efficient execution of the first request or the second request.

Optionally, the distributed ledger arrangement further comprises an autonomous agent map configured to associate a given autonomous agent with a corresponding functionality and record the given autonomous agent as being associated with the corresponding functionality. The term "autonomous agent map" as used herein refers to a component within the distributed ledger arrangement. In this regard, the autonomous agent map is used to establish associations between the given autonomous agents and their corresponding functionalities and maintain records of these associations. Moreover, when the new autonomous agent is created or a specific functionality is defined within the decentralized transaction system, the autonomous agent map is responsible for recording the relationship between the given autonomous agent and its corresponding functionality. This mapping process provides a clear reference for the at least one computing node to identify which autonomous agent is responsible for carrying out which tasks or actions. For example, it might associate a particular agent with the task of order book-based trade verification, and another agent with order execution.

By recording these associations, the at least one computing node can execute tasks efficiently and accurately based on the roles of the autonomous agents.

Optionally, when a given autonomous agent fails to fulfil a given request, the at least one computing node is further configured to select another autonomous agent from the agent database and use the other autonomous agent as a given autonomous agent. In this regard, when the given autonomous agent fails to fulfil the given request, the decentralized transaction system employs a mechanism to address the failure of selecting the given autonomous agent. In this regard, the at least one computing node is configured to select an alternative or the another autonomous agent from the agent database. This selection process can be based on various factors, including the type of the first request or the second request, the availability and capabilities of the other autonomous agents, and predefined rules or criteria.

Beneficially, such mechanism ensures the decentralized transaction system's resilience and continuous operation. For example, if one autonomous agent encounters a problem, such as a technical issue or being overwhelmed with requests, the at least one computing node can swiftly adapt by selecting another autonomous agent to handle the first request or the second request. This process enhances the reliability and fault tolerance of the decentralized transaction system, ensuring that requests are addressed even in the face of agent failures. The at least one computing node also contributes to efficient load distribution among the autonomous agents, optimizing their utilization and overall system performance. Additionally, the at least one computing node minimizes service disruptions, ensuring a seamless experience for the first user or the second user.

The present disclosure also relates to the decentralized transaction method of operating the decentralized transaction system as described above. Various embodiments and variants disclosed above, with respect to the aforementioned decentralized transaction system, apply mutatis mutandis to the decentralized transaction method of operating the decentralized transaction system.

Optionally, the method comprises:
checking whether an autonomous agent that is configured to serve the first request exists in the agent database, upon receiving the first request for placing the first trade on the platform;
using said autonomous agent as the first autonomous agent when the autonomous agent that is configured to serve the first request exists in the agent database;
creating a new autonomous agent and use the new autonomous agent as the first autonomous agent when the autonomous agent that is configured to serve the first request does not exist in the agent database.

DETAILED DESCRIPTION OF THE DRAWINGS

Figure 1:
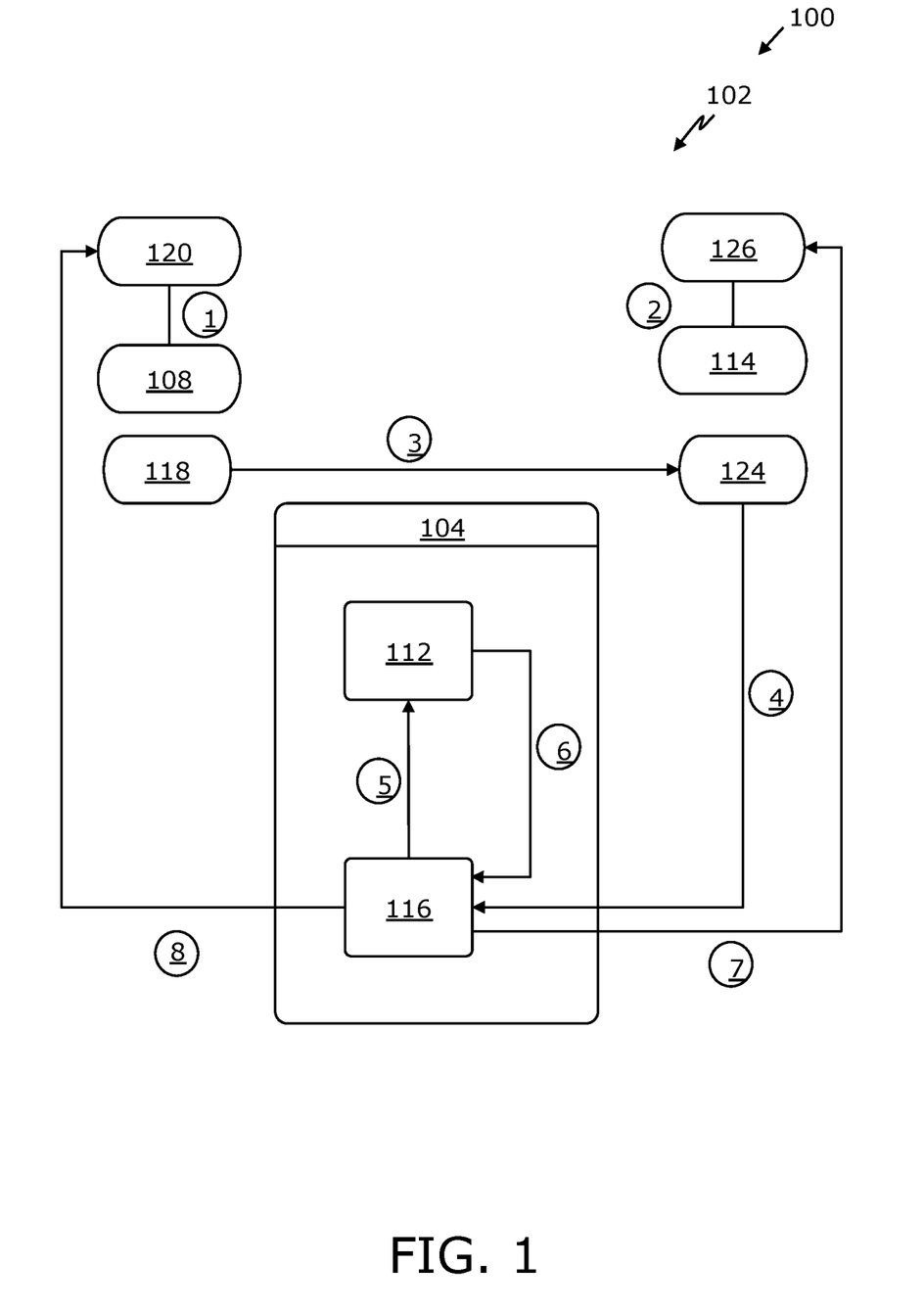
FIG. 1 is an illustration of a decentralized transaction system, in accordance with an embodiment of the present disclosure.

Referring to FIG. 1, illustrated is a decentralized transaction system 100, in accordance with an embodiment of the present disclosure. As shown, the decentralized transaction system 100 comprises a plurality of computing nodes configured to implement a platform 102 for enabling autonomous agent-based trading using a decentralized order book model, wherein each computing node is communicably coupled to a distributed ledger arrangement 104, a plurality of user devices, and an agent database comprising a plurality of autonomous agents.

The at least one computing node is configured to: receive, from a first user device 108 amongst the user devices, a first request (at point 1) for placing a first trade on the platform 102, wherein upon placement of the first trade, a first smart contract 112 executing on the distributed ledger arrangement 104 is configured to lock funds for the first trade; receive, from a second user device 114 amongst the user devices, a second request (at point 2) for placing a second trade on the platform 102, wherein upon placement of the second trade, a second smart contract 116 executing on the distributed ledger arrangement 104 is configured to lock a trade subject for the second trade; send, to the agent database, a first notification regarding placement of the first trade on the platform 102, for a first autonomous agent 118 associated with a first user 120 of the first user device 108; send, to the agent database, a second notification regarding placement of the second trade on the platform, for a second autonomous agent 124 associated with a second user 126 of the second user device 114, the second user 126 is a second party in the decentralized transaction.

The at least one computing node is configured to create a communication interface for enabling peer to peer communication between the first autonomous agent 118 and the second autonomous agent 124 via the platform, wherein the first autonomous agent 118 is configured to send (at point 3) a first set of trade parameters and a first digital signature of the first autonomous agent 118 to the second autonomous agent 124 in the agent database.

The at least one computing node is configured to facilitate via a processing interface agent-based trade match via the platform 102, wherein the second autonomous agent 124 is configured to perform a trade match, and to send (at point 4) the first digital signature along with the first set of trade parameters and a second set of trade parameters to the second smart contract 116, wherein the second set of trade parameters is related to the second user device.

The at least one computing node is configured to employ the processing interface for enabling order book-based trade verification via the platform 102, wherein the second smart contract 116 is configured to send (at point 5) the first digital signature along with the first set of trade parameters and the second set of trade parameters to the first smart contract 112 for verification, the first smart contract 112 is configured to verify the first digital signature and the first set of trade parameters and the second set of trade parameters, and upon successful verification, the first smart contract 112 is configured to transfer (at point 6) the funds for the first trade from the first smart contract 112 to the second smart contract 116, the second smart contract 116 is then configured to complete the decentralized trading by executing (at point 7) the transfer of the locked funds to the second user 126 and executing (at point 8) the transfer of the locked trade subject to the first user 120.

Figure 2:
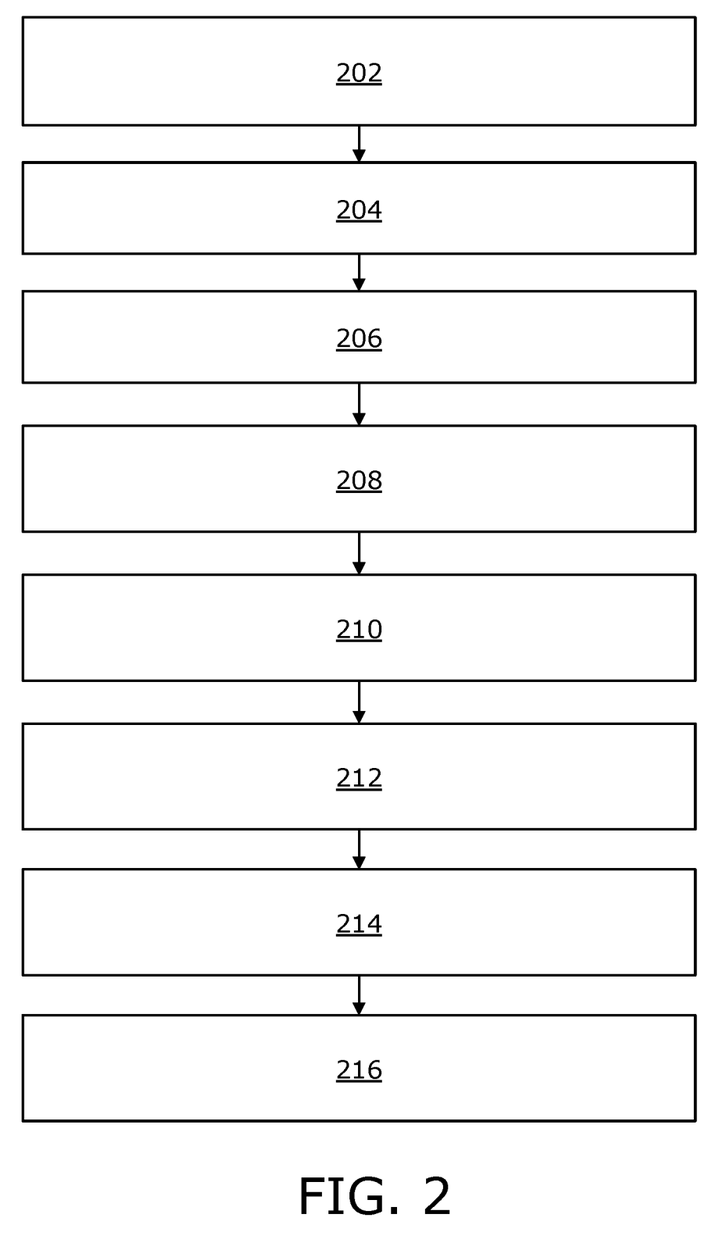
FIG. 2 is an illustration of a flowchart depicting steps of a decentralized transaction method of operating a decentralized transaction system, in accordance with an embodiment of the present disclosure.

Referring to FIG. 2, illustrated is a flowchart depicting steps of a decentralized transaction method of operating a decentralized transaction system, in accordance with an embodiment of the present disclosure. At step 202, a platform is implemented, using a plurality of computing nodes comprised in the decentralized transaction system, for enabling autonomous agent-based trading using a decentralized order book model, wherein each computing node is communicably coupled to a distributed ledger arrangement, a plurality of user devices, and an agent database comprising a plurality of autonomous agents. At step 204, a first request is received for placing a first trade on the platform, from a first user device amongst the user devices, wherein upon placement of the first trade, a first smart contract executing on the distributed ledger arrangement is configured to lock funds for the first trade. At step 206, a second request is received, from a second user device amongst the user devices, for placing a second trade on the platform, wherein upon placement of the second trade, a second smart contract executing on the distributed ledger arrangement is configured to lock a trade subject for the second trade. At step 208, a first notification regarding placement of the first trade on the platform is sent, to the agent database, for a first autonomous agent associated with a first user of the first user device. At step 210, a second notification regarding placement of the second trade on the platform is sent, to the agent database, for a second autonomous agent associated with a second user of the second user device, the second user is a second party in the decentralized transaction. At step 212, a communication interface is created for enabling peer to peer communication between the first autonomous agent and the second autonomous agent via the platform, wherein the first autonomous agent is configured to send a first set of trade parameters and a first digital signature of the first autonomous agent to the second autonomous agent in the agent database. At step 214, agent-based trade match via the platform is facilitated via a processing interface, wherein the second autonomous agent is configured to perform a trade match, and to send the first digital signature along with the first set of trade parameters and a second set of trade parameters to the second smart contract, wherein the second set of trade parameters is related to the second user device.

At step 216, the processing interface is employed for enabling order book-based trade verification via the platform, wherein the second smart contract is configured to send the first digital signature along with the first set of trade parameters and the second set of trade parameters to the first smart contract for verification, the first smart contract is configured to verify the first digital signature and the first set of trade parameters and the second set of trade parameters, and upon successful verification, the first smart contract is configured to transfer the funds for the first trade from the first smart contract to the second smart contract, the second smart contract is then configured to complete the decentralized trading by executing the transfer of the locked funds to the second user and executing the transfer of the trade subject to the first user.

The aforementioned steps are only illustrative and other alternatives can also be provided where one or more steps are added, one or more steps are removed, or one or more steps are provided in a different sequence without departing from the scope of the claims herein.

What is claimed is:

1. A decentralized transaction system comprising a plurality of computing nodes configured to implement a platform for enabling autonomous agent-based trading using a decentralized order book model, wherein each computing node is communicably coupled to a distributed ledger arrangement, a plurality of user devices, and an agent database comprising a plurality of autonomous agents, and wherein at least one computing node is configured to:
receive, from a first user device amongst the user devices, a first request for placing a first trade on the platform, wherein upon placement of the first trade, a first smart contract executing on the distributed ledger arrangement is configured to lock funds for the first trade;
receive, from a second user device amongst the user devices, a second request for placing a second trade on the platform, wherein upon placement of the second trade, a second smart contract executing on the distributed ledger arrangement is configured to lock a trade subject for the second trade;
send, to the agent database, a first notification regarding placement of the first trade on the platform, for a first autonomous agent associated with a first user of the first user device;
send, to the agent database, a second notification regarding placement of the second trade on the platform, for a second autonomous agent associated with a second user of the second user device, the second user is a second party in the decentralized transaction;
create a communication interface for enabling peer to peer communication between the first autonomous agent and the second autonomous agent via the platform, wherein
the first autonomous agent is configured to send a first set of trade parameters and a first digital signature of the first autonomous agent to the second autonomous agent in the agent database,
facilitate via a processing interface agent-based trade match via the platform, wherein
the second autonomous agent is configured to perform a trade match, and to send the first digital signature along with the first set of trade parameters and a second set of trade parameters to the second smart contract, wherein the second set of trade parameters is related to the second user device;
employ the processing interface for enabling order book-based trade verification via the platform, wherein
the second smart contract is configured to send the first digital signature along with the first set of trade parameters and the second set of trade parameters to the first smart contract for verification,
the first smart contract is configured to verify the first digital signature and the first set of trade parameters and the second set of trade parameters, and upon successful verification, the first smart contract is configured to transfer the funds for the first trade from the first smart contract to the second smart contract,
the second smart contract is then configured to complete the decentralized trading by executing the transfer of the locked funds to the second user and executing the transfer of the locked trade subject to the first user.

2. The decentralized transaction system of claim 1, wherein the first set of trade parameters comprises at least one of: a timeframe needed for completion of the first trade, a cost associated with the first trade, a quantity associated with the first trade, a quality associated with the first trade, a customised instruction associated with the first trade, an asset type, a preference of the autonomous agents, or delivery terms.

3. The decentralized transaction system of claim 1, wherein the second set of trade parameters comprises at least one of: a timeframe needed for completion of the second trade, a cost associated with the second trade, a quantity associated with the second trade, a quality associated with the second trade, a customised instruction associated with the second trade, an asset type, a preference of the autonomous agents, or delivery terms.

4. The decentralized transaction system of claim 1, wherein the trade subject is selected from at least one of: a commodity, a digital currency.

5. The decentralized transaction system of claim 1, wherein the second autonomous agent is configured to use a distributed public key infrastructure (PKI) to verify the first digital signature and the first set of trade parameters.

6. The decentralized transaction system of claim 1, wherein the first smart contract is configured to use a distributed public key infrastructure (PKI) to verify the first digital signature and the first set of trade parameters.

7. The decentralized transaction system of claim 1, wherein when the transfer of the locked funds is executed for the first trade from the first smart contract to the second smart contract, an ownership of the locked funds is transferred from the first user to the second user and, wherein when the transfer of the locked trade subject is executed for the second trade from the second smart contract to the first smart contract, an ownership of the locked trade subject is transferred from the second user to the first user.

8. The decentralized transaction system of claim 1, wherein the at least one computing node is configured to:

upon receiving the first request for placing the first trade on the platform, check whether an autonomous agent that is configured to serve the first request exists in the agent database;

when the autonomous agent that is configured to serve the first request exists in the agent database, use said autonomous agent as the first autonomous agent;

when the autonomous agent that is configured to serve the first request does not exist in the agent database, create a new autonomous agent and use the new autonomous agent as the first autonomous agent.

9. The decentralized transaction system of claim 1, wherein the distributed ledger arrangement further comprises a smart contract map configured to associate a given smart contract with a given autonomous agent and to record the given smart contract as being associated with the given autonomous agent.

10. The decentralized transaction system of claim 1, wherein the distributed ledger arrangement further comprises an autonomous agent map configured to associate a given autonomous agent with a corresponding functionality and record the given autonomous agent as being associated with the corresponding functionality.

11. The decentralized transaction system of claim 1, wherein a given request is received from at least one of: a software application executing on a given user device, a software application executing on a computing device that is communicably coupled to the given user device, a cloud-based software application, a digital twin of the given user a digital representation of the given user, an artificial intelligence model (AI-model) based on a Large Language Model (LLM).

12. The decentralized transaction system of claim 1, wherein when a given autonomous agent fails to fulfil a given request, the at least one computing node is further configured to select another autonomous agent from the agent database and use the other autonomous agent as a given autonomous agent.

13. A decentralized transaction method of operating a decentralized transaction system that comprises a plurality of computing nodes configured to implement a platform for enabling autonomous agent-based trading using a decentralized order book model, wherein each computing node is communicably coupled to a distributed ledger arrangement, a plurality of user devices, and an agent database comprising a plurality of autonomous agents, the method comprising:

receiving, from a first user device amongst the user devices, a first request for placing a first trade on the platform, wherein upon placement of the first trade, a first smart contract executing on the distributed ledger arrangement is configured to lock funds for the first trade;

receiving, from a second user device amongst the user devices, a second request for placing a second trade on the platform, wherein upon placement of the second trade, a second smart contract executing on the distributed ledger arrangement is configured to lock a trade subject for the second trade;

sending, to the agent database, a first notification regarding placement of the first trade on the platform, for a first autonomous agent associated with a first user of the first user device;

sending, to the agent database, a second notification regarding placement of the second trade on the platform, for a second autonomous agent associated with a second user of the second user device, the second user is a second party in the decentralized transaction;

creating a communication interface for enabling peer to peer communication between the first autonomous agent and the second autonomous agent via the platform, wherein the first autonomous agent is configured to send a first set of trade parameters and a first digital signature of the first autonomous agent to the second autonomous agent in the agent database, facilitating via a processing interface agent-based trade match via the platform, wherein the second autonomous agent is configured to perform a trade match, and to send the first digital signature along with the first set of trade parameters and a second set of trade parameters to the second smart contract, wherein the second set of trade parameters is related to the second user device;

employing the processing interface for enabling order book-based trade verification via the platform, wherein the second smart contract is configured to send the first digital signature along with the first set of trade parameters and the second set of trade parameters to the first smart contract for verification, the first smart contract is configured to verify the first digital signature and the first set of trade parameters and the second set of trade parameters, and upon successful verification, the first smart contract is configured to transfer the funds for the first trade from the first smart contract to the second smart contract, the second smart contract is then configured to complete the decentralized trading by executing the transfer of the locked funds to the second user and executing the transfer of the trade subject to the first user.

14. The decentralized transaction method of claim 13, wherein the method comprises:

checking whether an autonomous agent that is configured to serve the first request exists in the agent database, upon receiving the first request for placing the first trade on the platform;

using said autonomous agent as the first autonomous agent when the autonomous agent that is configured to serve the first request exists in the agent database;

creating a new autonomous agent and use the new autonomous agent as the first autonomous agent when the autonomous agent that is configured to serve the first request does not exist in the agent database.

\* \* \* \* \*